United States Patent Office 3,471,302
Patented Oct. 7, 1969

3,471,302
PREPARATION OF WHOLE EGG
MAGMA PRODUCT
Alan B. Rogers, 80th Ave. and Oak Ridge Drive, Palos Park, Ill. 60464; Michael Sebring, 8 S. 6701 Lester Lane, Westmont, Ill. 60559; and Ralph W. Kline, 22 W. 417 Balsam Drive, Glen Ellyn, Ill. 60137
No Drawing. Filed July 19, 1966, Ser. No. 566,240
Int. Cl. A23b 5/00
U.S. Cl. 99—161          5 Claims

ABSTRACT OF THE DISCLOSURE

Whole egg magma is treated to free it of viable Salmonella organisms by heating the magma to a temperature in the range of 130–139° F. (preferably 134–136° F.) in the presence of about 0.025–0.15 weight percent of hydrogen peroxide for at least two minutes to pasteurize the egg magma.

---

This invention relates to the preparation of a whole egg magma product, and more particularly to a pasteurized whole egg magma free of viable Salmonella organisms and useful in the preparation of baked products of high volume.

Under present general practice, whole eggs are pasteurized by heat alone at temperatures of 140–142° F. and above for a period of about 3½ minutes to destroy Salmonella and other pathogenic organisms. In such operations, there are fluctuations in temperature and time conditions, but while such conditions are effective in destroying organisms, it is found that the treatment also results in the loss of important emulsifying characteristics found particularly in the yolk material. The lipo-protein in the yolk has a very beneficial effect in emulsifying fat during the preparation of products such as cream puffs, eclairs, unleavened sponge cakes, and the like, and when the emulsifying characteristics are impaired the baked products are greatly reduced in size, sometimes as much as tenfold. While artificial emulsifiers, such as lecithin, shortenings, eac., can be added to restore such products partly to their desired size, this represents an expensive procedure and the baked product remains an inferior product.

If hydrogen peroxide is employed as an aid to heat in order to pasteurize whole egg, the problem is further complicated because the egg white portion, which forms the major part of the whole egg, contains large amounts of indigenous catalase, and catalase in the presence of hydrogen peroxide causes a rapid breakdown of hydrogen peroxide into oxygen and water. Consequently, it has been believed necessary to inactivate the indigenous catalase by a pre-heating step prior to the use of the hydrogen peroxide.

We have discovered that it is possible to destroy the Salmonella organisms and to pasteurize the whole egg magma while retaining the full emulsifying properties of the lipo-protein fraction of the yolk by employing a temperature range of 130–139° F. and while utilizing hydrogen peroxide in a very small proportion. It was surprising to find that under these conditions, it was unnecessary to inactivate the indigenous catalase, and the preheating step could be dispensed with. The pasteurized egg product is effective in producing baked products of large volume, including cream puffs, eclairs, unleavened sponge cake, and the like, while at the same time it is free of viable Salmonella organisms.

A primary object, therefore, of the inevntion is to provide a process for the preparation of whole egg magma free of viable Salmonella organisms and retaining the emulsifying properties of the egg yolk. A further object is to prepare a whole egg product which is effective in producing baked products of large volume and which retains the full emulsifying properties of the egg yolk. Other specific objects and advantages will appear as the specification proceeds.

In one embodiment of our invention, whole eggs are brought to a temperature in the range of about 130° to about 139° F. in the presence of hydrogen peroxide in the range of about .025–.15 weight percent for a period of time sufficient to bring about pasteurization of the whole egg magma. We prefer to maintain the magma mixed with the hydrogen peroxide within the temperature range for at least two minutes or for a period of minutes which under the temperature conditions of the process pasteurizes the product and destroys the Salmonella.

As a specific illustration of the process, excellent results have been obtained by heating the magma, in the presence of at least 0.05 weight percent of hydrogen peroxide, to a temperature of about 135° F. for a period of about 3½ minutes. The hydrogen peroxide is intimately mixed with the egg magma so as to contact every portion of the magma, and the heating is continued for the necessary time to bring about pasteurization of the egg magma. When the egg magma is pasteurized, it is found that the Salmonella organisms have been destroyed. The pasteurization may be carried out in the usual heat exchange plates followed by tube apparatus employed for continuous flow pasteurization of liquid food products, the hydrogen peroxide being injected into the stream of magma and the hydrogen peroxide and magma then proceeding under turbulent flow through the tubes so as to bring about an intimate admixture of the peroxide and magma.

In the foregoing process, the hydrogen peroxide may vary from about 0.025 to 0.15 weight percent. In the temperature range of 130–139° F., we find that an extremely small amount of hydrogen peroxide will suffice, and where the temperature is maintained for about 3½ minutes we prefer to employ about 0.05 weight percent of hydrogen peroxide. Best results have been obtained from the standpoint of retaining the full emulsifying properties of the lipo-protein fraction of the yolk while destroying the viable Salmonella organisms, by employing a temperature of about 134–136° F. (preferably 135° F.).

Why under the above conditions it is unnecessary to employ a preheating step to inactivate the indigenous catalase, we are unable to explain. The presence of the yolk may have some influence, and the temperature range shown may also have some bearing on the matter. It was a surprise to find that the entire process could be carried out through the simple steps of holding the magma at 130–139° F. in the presence of hydrogen peroxide and without pretreating the egg magma in any manner.

Specific examples illustrative of the process may be set out as follows:

Example I

A series of tests were made in which whole eggs were heated for 3½ minutes at temperatures of 140° F. without hydrogen peroxide, and similar tests were made in which the magma was heated for the same length of time with hydrogen peroxide present and at a temperature of 135° F., the conditions and the results being set out in the following table in which "Before" indicates "before pasteurization" and "After" indicates "after pasteurization." The table shows the total amount of organisms and the coliform organisms present. The plus sign in the column entitled "After Pasteurization" indicates the presence of Salmonella, and the minus sign indicates the absence of Salmonella. The term "TNTC" means "too numerous to count." The term "LT" means "less than."

TABLE I

| Temperature, 3.5 min. | Hydrogen peroxide, percent | Salmonella organisms | | Total plate count | | Coliform count | |
|---|---|---|---|---|---|---|---|
| | | Initial numbers per/gram | After pasteurization | Before | After | Before | After |
| 140° F. | 0 | $1.7 \times 10^6$ | + | $9.2 \times 10^5$ | $3.4 \times 10^2$ | $1.6 \times 10^4$ | LT 10 |
| 140° F. | 0 | $4.4 \times 10^6$ | + | $17.0 \times 10^5$ | $10.0 \times 10^2$ | $6.6 \times 10^4$ | $4.4 \times 10^2$ |
| 140° F. | 0 | $6.2 \times 10^6$ | + | $26.0 \times 10^5$ | $26.0 \times 10^2$ | TNTC | $1.3 \times 10^2$ |
| 135° F. | .1 | $1.7 \times 10^6$ | − | $9.7 \times 10^5$ | $0.7 \times 10^2$ | $15.0 \times 10^4$ | LT 10 |
| 135° F. | .1 | $4.4 \times 10^6$ | − | $10.0 \times 10^5$ | $1.2 \times 10^2$ | $9.5 \times 10^4$ | LT 10 |
| 135° F. | .1 | $6.2 \times 10^6$ | − | $100.0 \times 10^5$ | LT 10 | TNTC | LT 10 |
| 135° F. | 0.05 | $4.7 \times 10^6$ | − | $2.9 \times 10^5$ | $22.0 \times 10^2$ | $3.2 \times 10^4$ | LT 10 |
| 135° F. | 0.05 | $4.7 \times 10^6$ | − | $2.6 \times 10^5$ | $4.0 \times 10^2$ | $3.1 \times 10^4$ | LT 10 |
| 135° F. | 0.05 | $4.7 \times 10^6$ | − | $4.4 \times 10^5$ | $1.0 \times 10^2$ | $2.8 \times 10^4$ | LT 10 |
| 135° F. | 0.05 | $4.7 \times 10^6$ | − | $2.3 \times 10^5$ | $1.0 \times 10^2$ | $1.1 \times 10^4$ | LT 10 |

Example II

Tests were made to determine the functional difference between raw unpasteurized whole eggs, whole eggs pasteurized at 140° F. for 3½ minutes, and whole eggs pasteurized at 135° F. for 3½ minutes in the presence of 0.01 percent hydrogen peroxide. The results were obtained in the baking of cream puffs and are set out in the following table:

TABLE II

| Product description: | Cream puff volume in cc./gram |
|---|---|
| Raw unpasteurized | 11.58 |
| 135° F. for 3.5 min. 0.1% $H_2O_2$ | 10.22 |
| Commercial pasteurized 140° F. for 3.5 min. Lot I | 6.80 |
| Commercial pasteurized 140° F. 3.5 min. Lot II | 6.34 |

Cream puff formula

In the preparation of the cream puffs, the following procedure was used. 1 lb. 4 oz. of water, 1 lb. 4 oz. of non-emulsified shortening and ½ oz. of salt were combined and brought to a temperature of 210° F. 1 lb. of bread flour was added, stirred into the mix, and the temperature brought back to 190° F. The mixture was then cooled to 160° F. While mixing, 2 lbs. of whole egg was added slowly. As soon as the egg was incorporated, 3.5 grams of ammonium carbonate and 4 oz. of liquid milk was added. The product was then bagged and baked at 425° F. for 30 minutes.

Example III

The effect of pasteurization conditions on cream puff shell volume and particularly the temperatures employed in pasteurization are shown in the following table:

TABLE III

| Pasteurization temperature, degrees F.: | Volume in cc./gram |
|---|---|
| 136 | 10.83 |
| 143 | 6.4 |
| 145 | 2.4 |
| 147 | 2.3 |
| Control unpasteurized whole egg | 11.58 |

While in the foregoing specification we have set out embodiments of the invention in considerable detail for the purpose of illustrating the invention, it will be understood that such details may be varied widely by those skilled in the art without departing from the spirit of our invention.

We claim:

1. In a method for preparing a pasteurized whole egg magma free of viable Salmonella organisms, the steps of heating said magma to a temperature in the range of 130–139° F. in the presence of hydrogen peroxide in a bactericidal concentration under the temperature conditions of the process and consisting of about 0.025–0.15 weight percent of hydrogen peroxide, and intimately mixing said hydrogen peroxide with said egg magma while maintaining said temperature for at least two minutes under said temperature conditions to pasteurize the egg magma.

2. The process of claim 1 in which the temperature range is about 134–136° F.

3. The process of claim 1 in which the hydrogen peroxide content is at least 0.05 weight percent and the temperature is maintained for about 3½ minutes.

4. A process for treating whole egg magma, comprising maintaining the temperature of the magma containing about 0.025–0.15 weight percent of hydrogen peroxide at 134–136° F. for at least two minutes.

5. In a process for the preparation of a pasteurized whole egg magma free of viable Salmonella organisms without substantially impairing the emulsifying properties of the lipo-proteins thereof, the steps of heating said magma to a temperature of about 135° F. in the presence of at least 0.025 weight percent of hydrogen peroxide, and intimately mixing said hydrogen peroxide with said egg magma while maintaining said temperature for about 3½ minutes to pasteurize the egg magma.

References Cited

UNITED STATES PATENTS

| | | | |
|---|---|---|---|
| 2,053,740 | 11/1936 | Reichert et al. | 99—213 |
| 2,125,398 | 9/1938 | Reichert et al. | 99—213 |
| 2,776,214 | 1/1957 | Lloyd et al. | 99—161 |
| 3,364,037 | 1/1968 | Mink et al. | 99—161 |

LIONEL M. SHAPIRO, Primary Examiner

R. M. ELLIOTT, Assistant Examiner

PO-1050
(5/69)

UNITED STATES PATENT OFFICE
CERTIFICATE OF CORRECTION

Patent No. 3,471,302      Dated October 7, 1969

Inventor(s) Alan B. Rogers, Michael Sebring and Ralph W. Kline

It is certified that error appears in the above-identified patent and that said Letters Patent are hereby corrected as shown below:

Column 4, line 5, change "143" to -- 143.5 --.

SIGNED AND
SEALED

DEC 23 1969

(SEAL)
Attest:

Edward M. Fletcher, Jr.
Attesting Officer

WILLIAM E. SCHUYLER, JR.
Commissioner of Patents